(12) United States Patent
Kuhr

(10) Patent No.: US 9,378,337 B2
(45) Date of Patent: Jun. 28, 2016

(54) DATA ITEM DELETION IN A DATABASE SYSTEM

(71) Applicant: Gernot Kuhr, Heidelberg (DE)

(72) Inventor: Gernot Kuhr, Heidelberg (DE)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 13/921,751

(22) Filed: Jun. 19, 2013

(65) Prior Publication Data

US 2014/0379670 A1 Dec. 25, 2014

(51) Int. Cl.
*G06F 17/30* (2006.01)
*G06F 3/06* (2006.01)
*G06F 21/00* (2013.01)
*G06F 21/62* (2013.01)

(52) U.S. Cl.
CPC ............ *G06F 21/00* (2013.01); *G06F 21/6245* (2013.01); *G06F 2221/2143* (2013.01)

(58) Field of Classification Search
CPC .................... G06F 17/30067; G06F 17/30489; G06F 3/0641
USPC ......................................................... 707/692
See application file for complete search history.

(56) References Cited

U.S. PATENT DOCUMENTS

| 5,107,419 | A * | 4/1992 | MacPhail | G06F 17/30011 700/83 |
| 9,002,805 | B1 * | 4/2015 | Barber | G06F 17/30303 707/692 |
| 2003/0093434 | A1 * | 5/2003 | Stickler | G06F 8/24 |
| 2007/0294308 | A1 * | 12/2007 | Megerian | G06F 17/30289 |
| 2009/0177704 | A1 * | 7/2009 | Consul | G06Q 10/107 |
| 2010/0106689 | A1 * | 4/2010 | Huslak | G06F 17/30085 707/662 |
| 2010/0138383 | A1 * | 6/2010 | Winters | G06F 21/6218 707/609 |
| 2012/0158669 | A1 * | 6/2012 | Morsi | G06F 17/30085 707/689 |
| 2014/0089278 | A1 * | 3/2014 | Lovinger | G06F 17/30194 707/694 |
| 2014/0236910 | A1 * | 8/2014 | Owuor | G06F 17/30345 707/694 |

* cited by examiner

*Primary Examiner* — Hosain Alam
*Assistant Examiner* — Robert F May
(74) *Attorney, Agent, or Firm* — Schwegman Lunberg & Woessner, P.A.

(57) ABSTRACT

Example systems and methods of deleting data stored in a database system are presented. In one example, a plurality of data items is received from an application and stored at the database system. Also received from the application and stored at the database system is deletion timing information for each of the data items. The deletion timing information for a data item may indicate when the data item is to be deleted from the database system. At least one of the data items may be deleted at the database system at a time indicated by its corresponding deletion timing information without assistance from the application.

15 Claims, 11 Drawing Sheets

DATA ITEM DELETION IN A DATABASE SYSTEM

FIELD

This application relates generally to data processing and, in an example embodiment, to deletion of data items in a database system.

BACKGROUND

Data privacy continues to be a significant concern to both businesses and their customers and clients. High capacity databases may contain vast amounts of personal and commercial confidential data that, if accessed successfully by a person not authorized to do so, may result in substantial personal and corporate financial losses of those associated with that data. Accordingly, to reduce the risk of such losses, most computer system applications that store and access records via a database may implement a records retention policy by which data for which there is no longer a compelling business purpose to retain are deleted. Aside from its data privacy benefits, such a data retention policy is also likely to facilitate more efficient use of data storage in the database, as data that is no longer important for some business or personal purpose may be removed to allow new, more pertinent data to be stored in the database.

Generally, each application that accesses a particular database is responsible for the creation, access, and ultimate deletion of its data. Consequently, the application is responsible for determining whether and, if so, when each item of data should be deleted, and for actually deleting one or more of the data items based on that determination.

In some implementations, an application may organize its data items as a plurality of business data objects, with each business data object further including a plurality of database records, such as, for example, separate rows of one or more database tables. To implement a database records retention policy that successfully deletes data regarding particular clients, customers, employees, products, and the like, at least some applications are capable of determining if and when each individual database record should be deleted.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
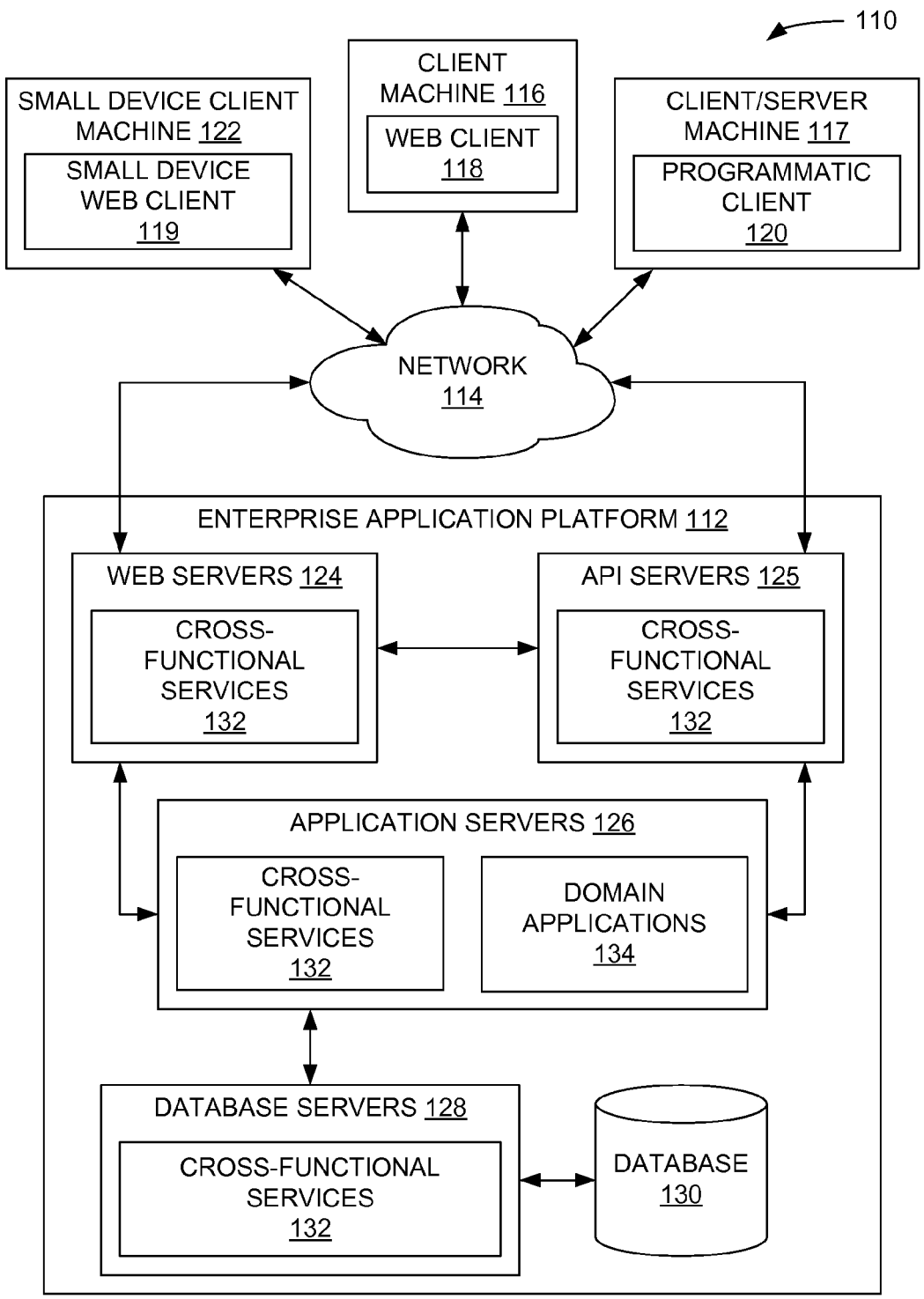
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128, which may facilitate access to one or more databases 130. The web servers 124, API servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
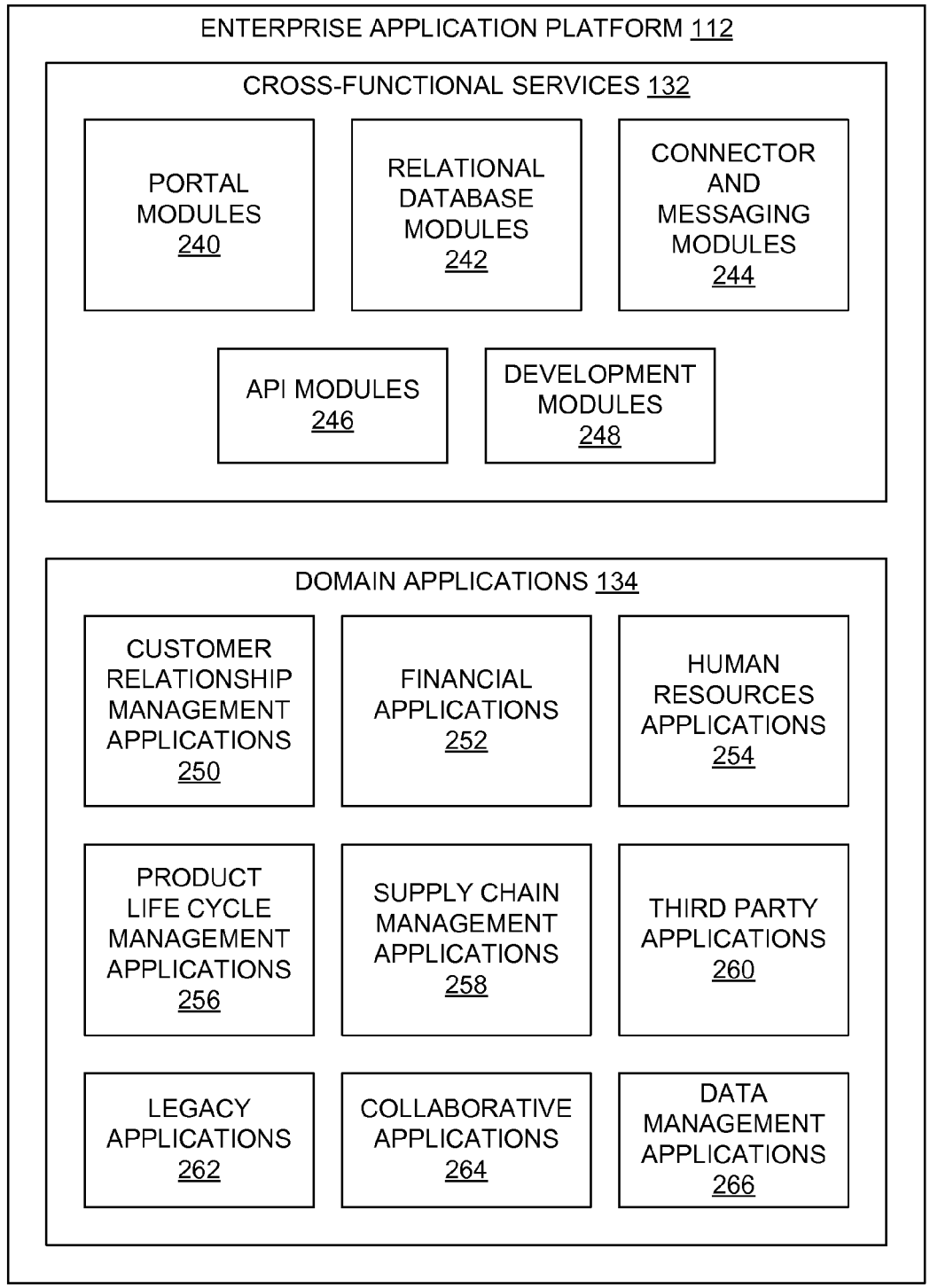
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, API modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regeneration module. In addition, the portal modules 240 may comply with web services standards and/or utilize a variety of Internet technologies, including, but not limited to, Java®, Java 2 Platform-Enterprise Edition (J2EE), SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft.NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, Structured Query Language (SQL), SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The API modules 246 may enable the development of service-based applications by exposing an interface to existing and new applications as services. Repositories may be included in the platform 112 as a central place to find available services when building applications.

The development modules 248 may provide a development environment for the adding, integrating, updating, and extending of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel who are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the lifecycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
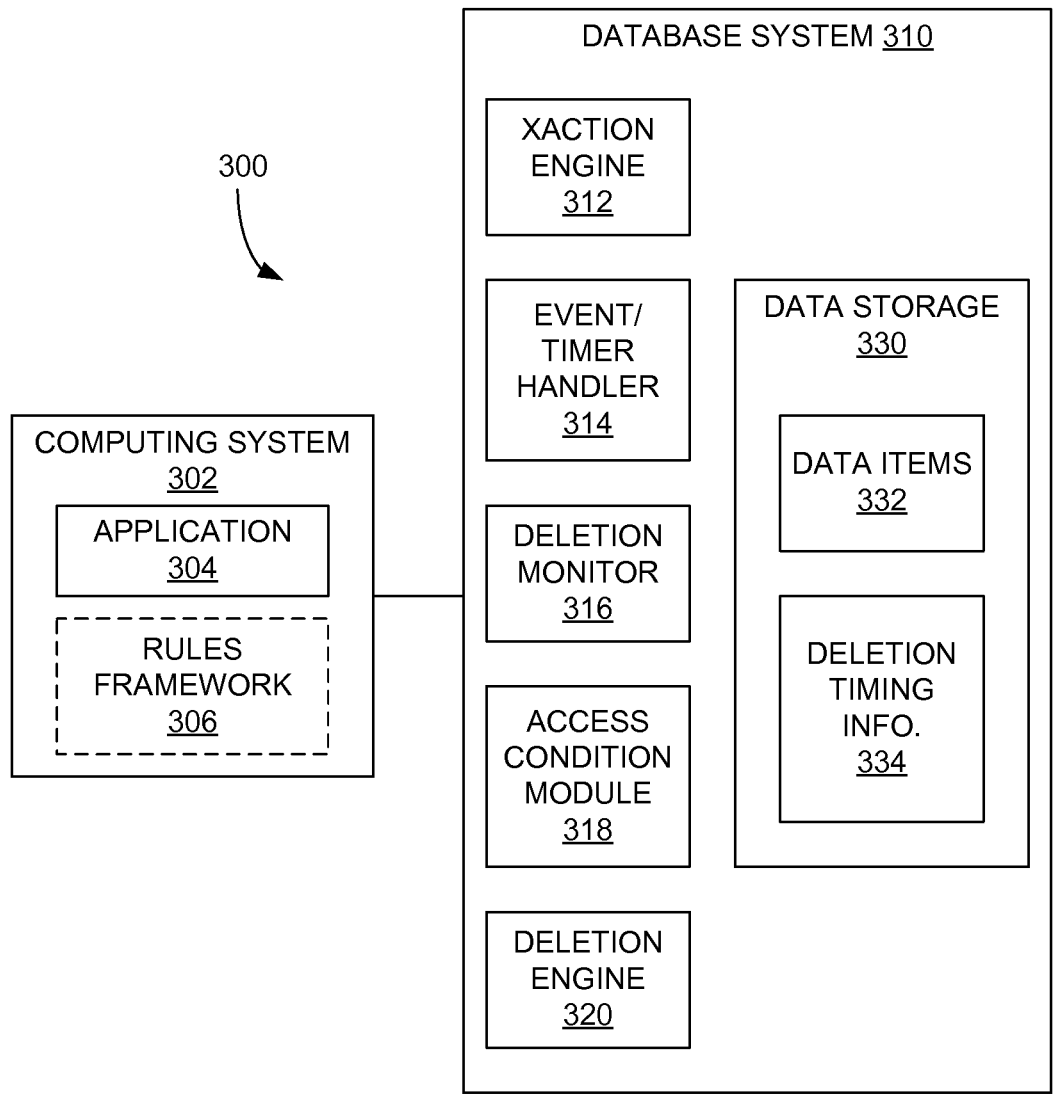
FIG. 3 is a block diagram of an example database system in communication with an application.

FIG. 3 is a block diagram of a system 300 including an example database system 310 in communication with an application 304 executing on a computing system 302. In general, the application 304 may determine when certain data items 332 stored in the data storage 330 of the database system 310 may be deleted, and store deletion timing information 334 based on that determination in the data storage 330. In at least some examples, the database system 310, having access to the deletion timing information 334, may then execute the deletion or removal of one or more data items 332 based on the deletion timing information 334. Such implementations would thus relieve the application 304 of the actual data item 332 deletion process, thereby allowing the application 304 to expend more execution time on other matters of interest. Other potential aspects of the system 300 and related embodiments are discussed in greater detail below.

In one example, the database system 310 may operate as the database server 128 in conjunction with the database 130 within the system 110 of FIG. 1. Further, the computing system 302, in one example, may operate as one of the application servers 126, and the application 304 may be any one of the domain applications 134 or cross-functional services 132 of FIGS. 1 and 2 that access the database 130 via one or more of the database servers 128 in order to store, access, and modify various kinds of data, such as business data objects. In another example, the computing system 302 may be one of the client machines 116, 117, and 122 of FIG. 1 interacting with the database servers 128 and the database 130 via the network 114. In one example, one of the client machines 116, 117, and 122 may be a personal computer (PC), a laptop computer, a tablet computer, a smart phone, a personal digital assistant (PDA), or any other device configured to execute an application 304 that accesses the database system 310. In a further embodiment, the computing system 302 and the database system 310 may be collocated within a single computing system or device. As a result, the various implementations discussed herein are not limited by the particular computing structure or system used.

The database system 310, as depicted in FIG. 3, may include a transaction engine 312, an event/timer handler 314, a deletion monitor 316, an access condition module 318, a deletion engine 320, and data storage 330. Further, the data storage 330 may include data items 332, such as, for example, business data objects, and deletion timing information 334. Other conventional components that may be included in the database system 310, such as one or more processors, program memory, user and communication interfaces, and the like, are not depicted in FIG. 3 to focus and simplify the following discussion. Further, some modules of FIG. 3 may be combined with others, or subdivided into further modules. Also, some of the modules shown in the database system 310 may be omitted while others may be added in some implementations.

The transaction engine 312 may perform typical database operations on behalf of the database system 310 in response to database commands issued by the application 304, such as, for example, create a new data item 332, read a portion of an existing data item 332, modify an existing data item 332, and so on. The commands that cause such operations may be, for example, relational database queries or similar types of commands.

In one example, commands which involve the creation or modification of a data item 332 may also include the writing or storage of the deletion timing information 334 associated with the data items 332 involved. For example, commands for writing or modifying one or more fields or portions of a data item 332 may also write or modify deletion timing information 334 that is stored as part of its associated data item 332. In one example, the transaction engine 312 may also receive commands from the application 304 that cause the storing of the deletion timing information 334 as a separate data value that is associated with one of the data items 332 stored in the data storage 330. For example, the application 304 may transmit to the transaction engine 312 special commands or instructions provided via an application programming interface (API) of the database system 310 to set or modify the deletion timing information 334 for one or more data items 332.

The event/timer handler 314 may track one or more events occurring within the database system 310, such as the database system 310 entering a particular operational state or receiving an internally-generated (e.g., generated inside the database system 310) or externally-generated (e.g., generated outside the database system 310) signal, and cause the deletion monitor 316 to begin a determination of which data items 332 should be deleted based on the deletion timing information 334 in response to the event. An example of an internally-generated signal would be a signal indicating that the amount or percentage of storage consumed by the data items 332 has reached a predetermined threshold value. For an externally-generated signal, examples may be a command entered by a system operator through a console or other input interface of the database system 310, or a signal received from the application 304 executing on the computing system 302.

Further, the event/timer handler 314 may include, or be communicatively coupled with, a timer that provides a signal indicating when a predetermined amount of time has elapsed since initiation of the timer. In response, the event/timer handler 314 may then initiate a determination of which of the data items 332 should be deleted in view of the deletion timing information 334 in response to expiration of the timer. Presuming re-enabling of the timer after its expiration, the use of the timer may result in periodic monitoring of the deletion timing information 334 for each of the data items 332. In one example, the timer may be set to expire once or twice a day, although any length of time that is suitable in view of the nature of the data items 332 stored in the data storage 330 may be employed in other implementations.

As mentioned above, the deletion monitor 316 determines which of the data items 332 should be deleted or removed from the data storage 330 using the deletion engine 320 based on the deletion timing information 334 for each respective data item 332. The deletion timing information 334 for a data item 332 may include any information that would allow the deletion monitor 316 to determine whether the current time is appropriate to delete that data item 332. One example of the deletion timing information 334 may include a binary flag or similar data value indicating whether the associated data item 332 is to be deleted immediately, or as soon as possible or practical. In another example, the deletion timing information 334 may provide a particular date and/or time in the future at which the corresponding data item 332 should be deleted. In yet another implementation, the deletion timing information 334 may indicate a particular access condition of the corresponding data item 332 that, when exhibited by the data item 332, may cause the deletion monitor 316 to initiate deletion of the data item 332.

In some implementations, the deletion timing information 334 may be generated via a rules framework 306, which may be software executing on the computing system 302 or another system that may access the database system 310. For example, the rules framework 306 may generate the deletion timing information 334 for a corresponding data item 332 based on one or more preset rules indicating the deletion timing information 334 that is to be applied to one or more data items 332 based on the type of the data items 332, or based on other characteristics of the data items 332. These rules may be defined by a user or customer of the application 304 in at least some implementations. In other examples, the deletion timing information 334 may include the rules from which the actual deletion timing is generated.

With respect to this last example, the deletion monitor 316 may communicate with the access condition module 318, which may determine one or more access conditions exhibited by each of the data items 332. Examples of such access conditions may include, but are not limited, the date and/or time of the most recent read and/or write access of the data item 332, and the access rate (read, write, or total) of the data item 332. As discussed above, if the access condition for a particular data item 332 compares favorably with a predetermined access condition expressed in the deletion timing information 334 associated with the data item 332, the deletion monitor 316 may then initiate deletion of the data item 332. For example, if a minimum period of time indicated in the deletion timing information 334 has elapsed since the last read or write access of the data item 332, or the read and/or write access rate associated with the data item 332 has dropped below a particular level specified in the deletion timing information 334, the deletion monitor 316 may cause the deletion of the data item 332.

In one example, the deletion monitor 316 may call or invoke the deletion engine 320 to perform the actual deletion of the data item 332. In some examples, the deletion engine 320 may also perform any reclamation operations to ensure that the portion of the data storage 330 formerly occupied by the deleted data item 332, as well as that of its associated deletion timing information 334, is available for storage of new data items 332 and deletion timing information 334. In a further implementation, the deletion monitor 316 may rearrange the remaining data items 332 and deletion timing information 334 within the data storage 330 to render subsequent access to the remaining data items 332 and deletion timing information 334 faster and more efficient.

Thus, by employing the database system 310 of FIG. 3, the database system 310 may perform the actual monitoring of deletion conditions for the data items 332, as well as the actual deletion of those data items 332 from the data storage 330, thus relieving the application 304 of the responsibility for those particular operations. Such embodiments may be effective in more efficiently implementing data deletion associated with data retention policies implemented by corporations and other entities, especially in database systems 310 that perform their normal access operations quickly and efficiently (such as, for example, the SAP HANA® in-memory database technology provided by SAP® AG), thus possibly providing excess processing capacity for implementation of the data deletion functionality described herein. Other possible aspects of the database system 310, as well as other systems and methods disclosed herein, are explained in the following description.

Figure 4:
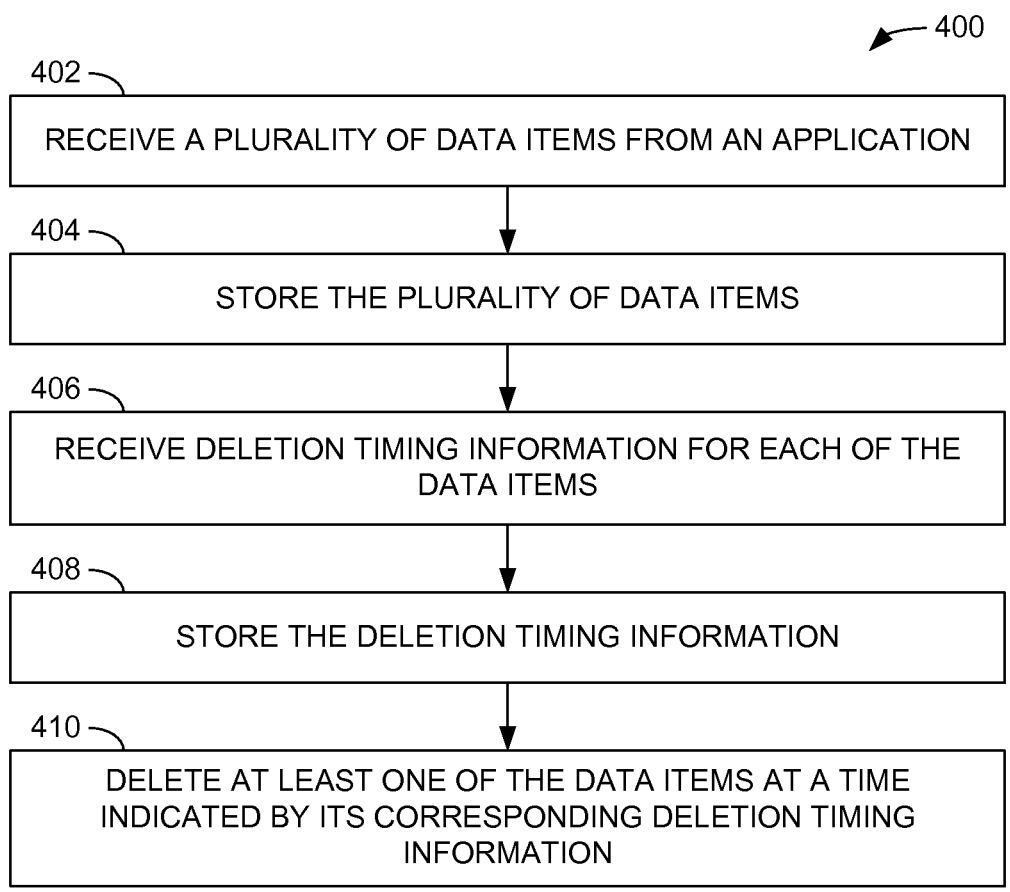
FIG. 4 is a flow diagram illustrating an example method of data item deletion in a database system.

FIG. 4 is a flow diagram illustrating an example method 400 of data item deletion in a database system, such as the database system 310 of FIG. 3. While the various operations of the method 400 are described in reference to the database system 310, other devices or systems may be employed to perform the method 400 in other embodiments.

In the method 400, a plurality of data items (e.g., the data items 332 of FIG. 3) are received from an application 304 (operation 402), and are stored (operation 404), such as in the data storage 330 of FIG. 3. Similarly, deletion timing information (e.g., the deletion timing information 334 of FIG. 3) for each of the data items 332 is received (operation 406) and stored (operation 408), such as in the data storage 330. At least one of the data items 332 may then be deleted at a time indicated by its corresponding deletion timing information 334 (operation 410). In at least some examples, the database system 310 performs the deletion operation (operation 410) without assistance from the application 304.

While the operations 402 through 410 of the method 400 of FIG. 4 are shown in a specific order, other orders of operation, including possibly concurrent or continual execution of at least portions of one or more operations, may be possible in some implementations of method 400, as well as other methods discussed herein. In fact, each of the operations 402 through 410 may be performed in a continual, repetitive, or ongoing manner asynchronously during execution of the application 304 in some embodiments.

Figure 5A:
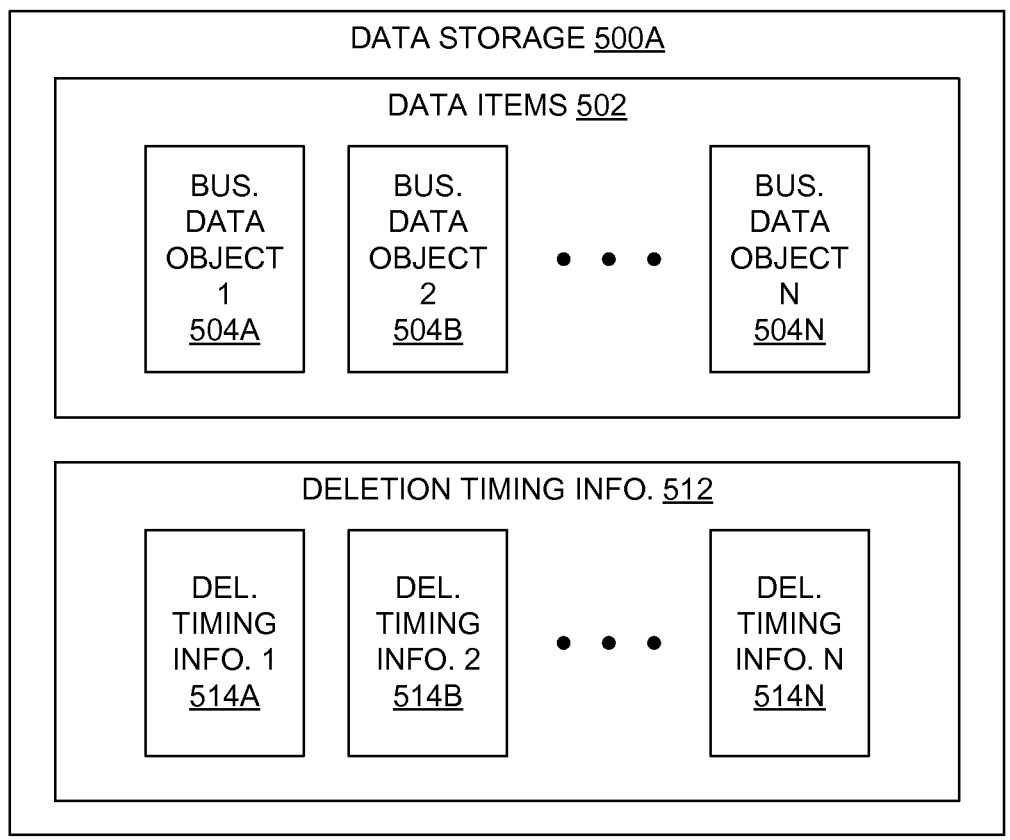
FIG. 5A is a block diagram illustrating example data items and their associated deletion timing information.

FIG. 5A is a block diagram illustrating example data items 502 and their associated deletion timing information 512 in data storage 500A, which may be an example of the data storage 330 of FIG. 3. In this particular example, the data items 502 include a plurality of business data objects 504, shown in FIG. 5A as business data object 1 504A, business data object 2 504B, and so forth, through business data object N 504N. The business data objects 504 may be any data object employed for a business purpose, including, but not limited to, customer data objects, product data objects, sales data objects, employee data objects, and the like. In one implementation, each of the business data objects 504 may include one or more database tables. Each of the business data objects 504 may also be associated with corresponding deletion timing information 514, depicted individually in FIG. 5A as deletion timing information 1 514A (for business data object 1 504A), deletion timing information 2 514B (for business data object 2 504B), and deletion timing information N 514N (for business data object N 504N). As a result, each of the business data objects 504 may be individually deleted depending on the corresponding deletion timing information 514.

Figure 5B:
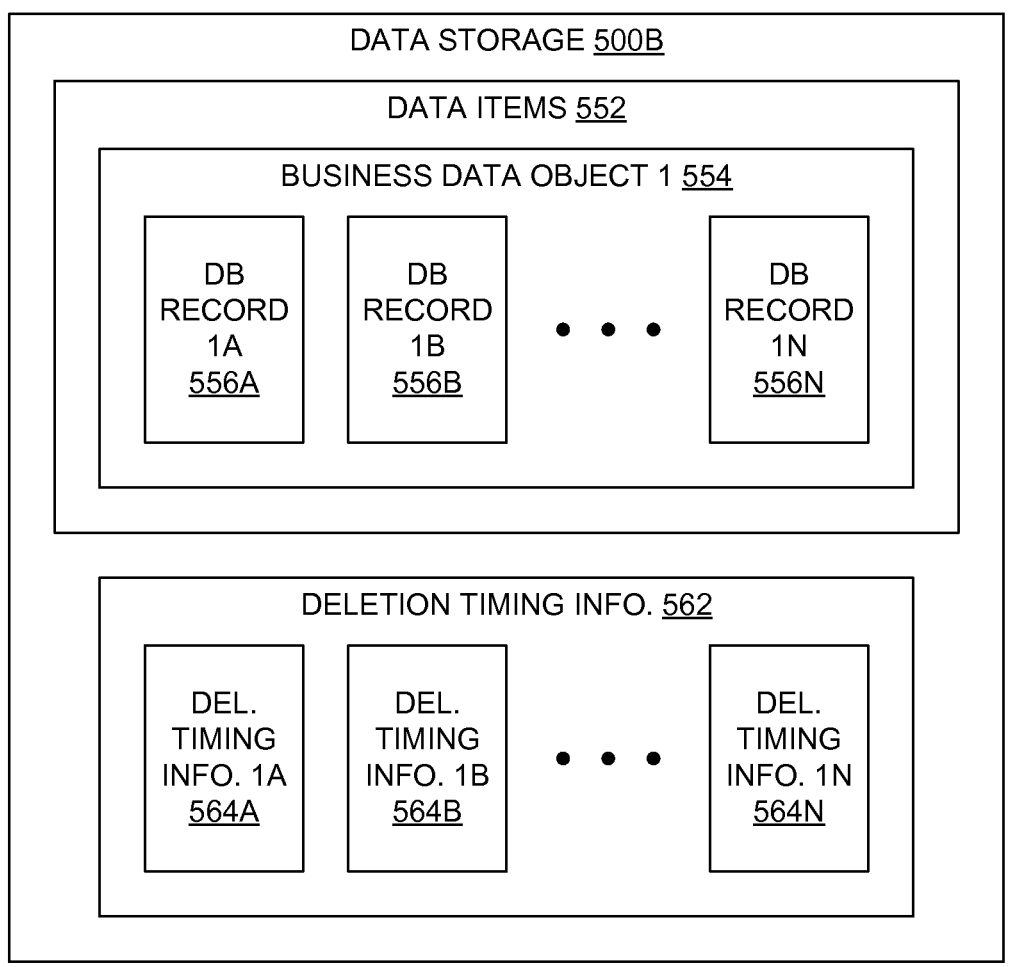
FIG. 5B is a block diagram illustrating other example data items and their associated deletion timing information.

FIG. 5B is a block diagram illustrating example data items 552 and their associated deletion timing information 562 in data storage 500B, which also may be an example of the data storage 330 of FIG. 3. In this particular example, a plurality of business data objects, one of which is shown as business data object 1 554, may be stored in the data storage 500B. In turn, the business data object 1 554 includes multiple database records 556, shown as database record 1A 556A, database record 1B 556B, and so on through database record 1N 556N. Other data items 552 in the data storage 500B may be similarly subdivided. In one implementation, in which the business data object 1 554 is a database table, each of the database records 556 may be a portion of the database table, such as a row or column of the table. In this example, each of the individual database records 556 within the single business data object 554 may be associated with corresponding deletion timing information 564, depicted as deletion timing information 1A 564A (for database record 1A 556A), deletion timing information 1B 564B (for database record 1B 556B), and deletion timing information 1N 564N (for database record 1N 556N). Accordingly, each of the database records 556 may be individually deleted based on its accompanying deletion timing information 564. In some implementations, a mixture of the schemes depicted in FIGS. 5A and 5B may be employed within a single data storage structure 500A, 500B. Further, both types of deletion timing information 514, 564 (e.g., object-based and record-based) may be applied to the same business data object 504, 554.

Figure 5C:
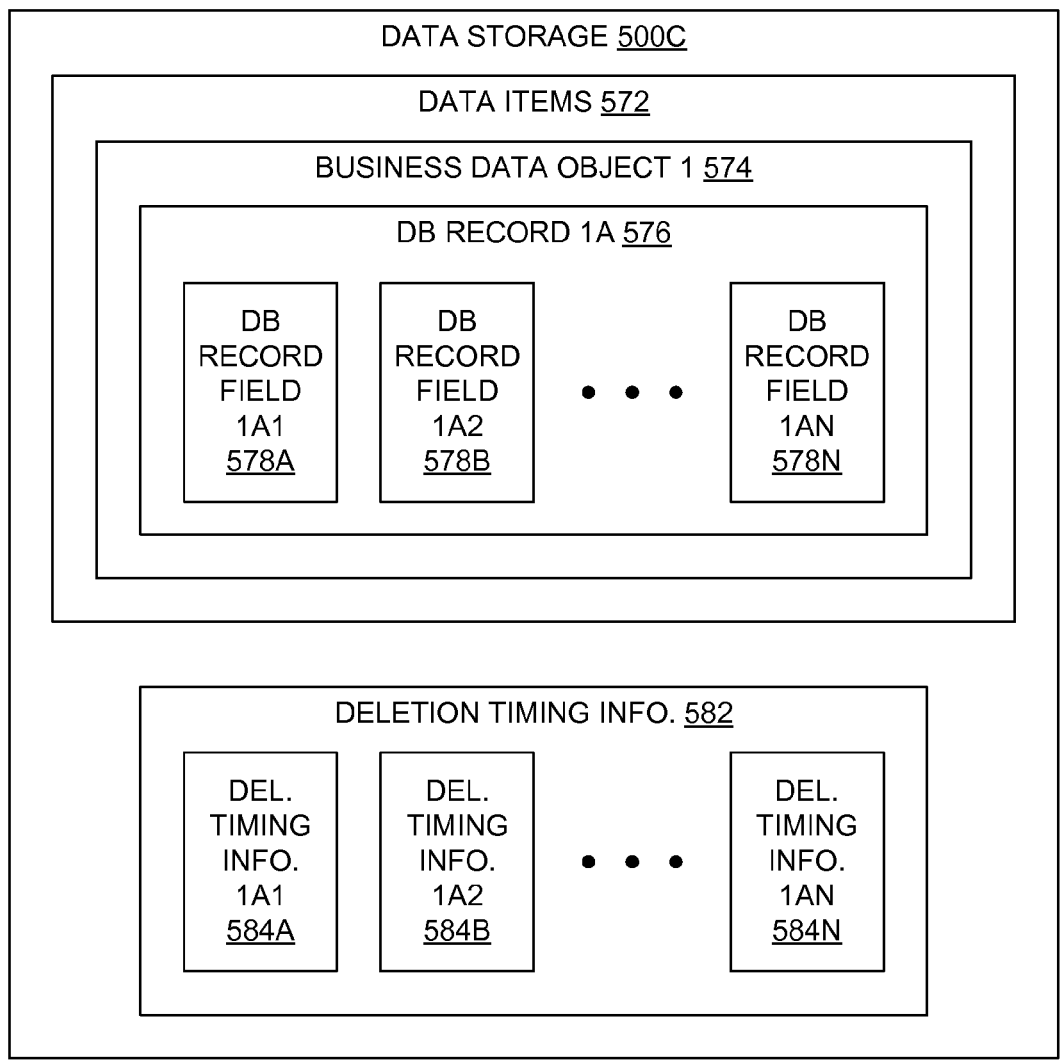
FIG. 5C is a block diagram illustrating yet other example data items and their associated deletion timing information.

FIG. 5C is a block diagram illustrating example data items 572 and their associated deletion timing information 582 in data storage 500C, which also may be an example of the data storage 330 of FIG. 3. In this particular example, a plurality of business data objects, one of which is shown as business data object 1 574, may be stored in the data storage 500C. In turn, the business data object 1 574 may include multiple database records, one of which is shown as database record 1A 576. Furthermore, the database record 1A 576 includes multiple database record fields, shown as database record field 1A1 578A, database record field 1A2 578B, and so on through database record field 1AN 578N. Other data items 572 in the data storage 500C may be similarly subdivided. In one implementation, presuming the business data object 1 574 is a database table, the database record 1A 576 may be a row of the database table. Consequently, each of the database record fields 578 may be a separate column of the table row identified as the database record 1A 576. In this example, each of the individual database record fields 578 within the single database record 1A 576 may be associated with corresponding deletion timing information 584, depicted as deletion timing information 1A1 584A (for database record field 1A1 578A), deletion timing information 1A2 584B (for database record field 1A2 578B), and deletion timing information 1AN 584N (for database record field 1AN 578N). Accordingly, each of the database record fields 576 may be individually deleted based on its accompanying deletion timing information 584.

In some implementations, a mixture of the schemes depicted in FIGS. 5A, 5B, and 5C may be employed within a single data storage structure 500A, 500B, and 500C. Further, each of the types of deletion timing information 514, 564, and 584 (e.g., object-based, record-based, and field-based) may be applied to the same business data object 504, 554, and 574.

In each of FIGS. 5A, 5B, and 5C, the deletion timing information 514, 564, and 584 is shown as being stored in a separate area in the data storage 500A, 500B, and 500C from their corresponding data items 502, 552, and 572. However, in other examples, each individual instance of the deletion timing information 514, 564, and 584 may be stored as a portion of its associated data item 502, 552, and 572. For example, referencing FIG. 5B, presuming each of the database records 556 of business data object 1 554 are separate rows of a database table, the deletion timing information 564 for each of the database records 556 may be stored as an additional column in that same database table associated with the business data object 1 554. Other possibilities of storing and relating the data items 502, 552, and 572 with their corresponding deletion timing information 514, 564, and 584 are also possible.

In some examples, the deletion timing information 514, 564, and 584 for a particular business data object 504, 554, and 574 may contained within one or more deletion data objects. More specifically, each deletion data object may refer to a different portion of its associated business data object 504, 554, and 574, with each deletion data object including the deletion timing information 514, 564, and 584 (and/or rules for generating the deletion timing information 514, 564, and 584) for its associated portion of the business data object 504, 554, and 574. For example, a single deletion data object may be associated with a business data object 504, 554, and 574 if the entire business data object 504, 554, and 574 is subject to the same deletion timing information 514, 564, and 584, or to the same rules for generating the deletion timing information 514, 564, and 584. In other examples, each of multiple deletion data objects, each of which is associated with one or more data tables, data table records, and/or data table record fields of the business data object 504, 554, and 574, may incorporate its specific deletion timing information 514, 564, and 584, or corresponding rules for generating the deletion timing information 514, 564, and 584. In one example, each particular field of a data object record listed in a deletion data object may be identified by a table key, record number, and field number of the corresponding business data object 504, 554, and 574.

Figure 6:
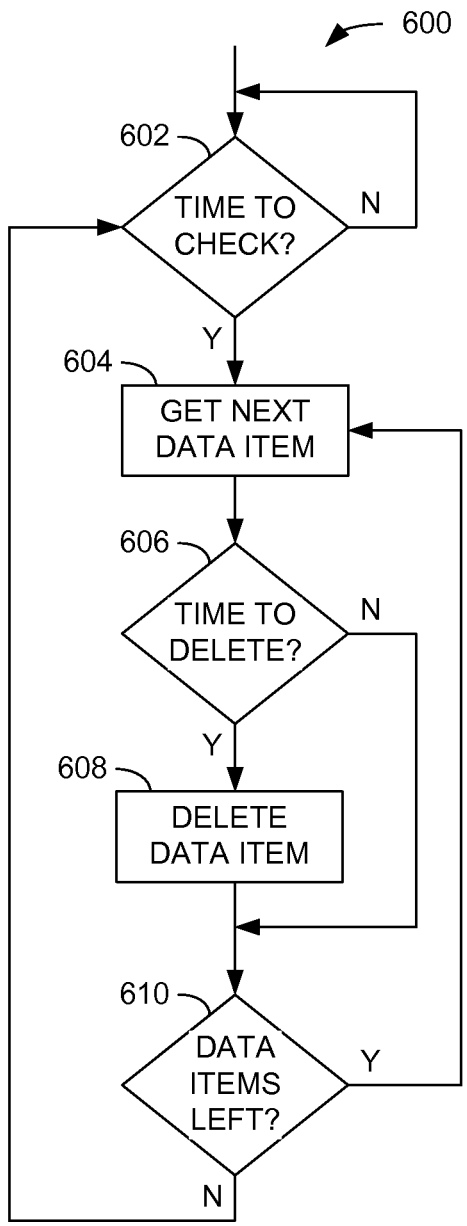
FIG. 6 is a flow diagram illustrating an example method of selecting and deleting data items from a database system.

FIG. 6 is a flow diagram illustrating an example method 600 of selecting and deleting data items 332 from a database system 310. In one example, the operations of method 600 may be subsumed within operation 410 of the method 400 of FIG. 4. Additionally, in one example, the deletion monitor 316 of FIG. 3, using one or more of the event/timer handler 314, the access condition module 318, and the deletion engine 320, may perform the various operations of the method 600. However, while the method 600 is described in terms of the database system 310, other implementations of the method 600 may employ other systems or components not explicitly discussed herein.

In the method 600, the deletion monitor 316 may determine via the event/timer handler 314 and/or the access condition module 318 whether it is time to check if one or more of the data items 332 should be deleted from the data storage 330 (operation 602). As described earlier, this determination can be made, for example, in response to the occurrence of an event, such as the receipt of a signal, or in response to the expiration of a timer, via the event/timer handler 314. If the time to check has not arrived, the deletion monitor 316 may continue to wait until an event or timer condition indicates that checking for deletion of the data items 332 is to commence.

If, instead, the condition to proceed occurs, the deletion monitor 316 may then acquire a data item 332 in the data storage 330 (operation 604) and determine whether the time has arrived to delete that data item 332 (operation 606). As explicated above, the deletion monitor 316 may consult the deletion timing information 334 (e.g., a deletion flag, a date and/or time for deletion, or some access condition) for that specific data item 332 to determine whether the data item 332 should be deleted. Presuming the data item 332 is to be deleted, the deletion monitor 316 may initiate the deletion via the deletion engine 320 (operation 608). After the data item 332 is checked and possibly deleted, the deletion monitor 316 may determine if there are any data items 332 left unchecked (operation 610), and if not, accesses the next data item 332 (operation 604). Otherwise, the deletion monitor 316 may wait until the next time the data items 332 of the data storage 330 are to be checked (operation 602).

Figure 7:
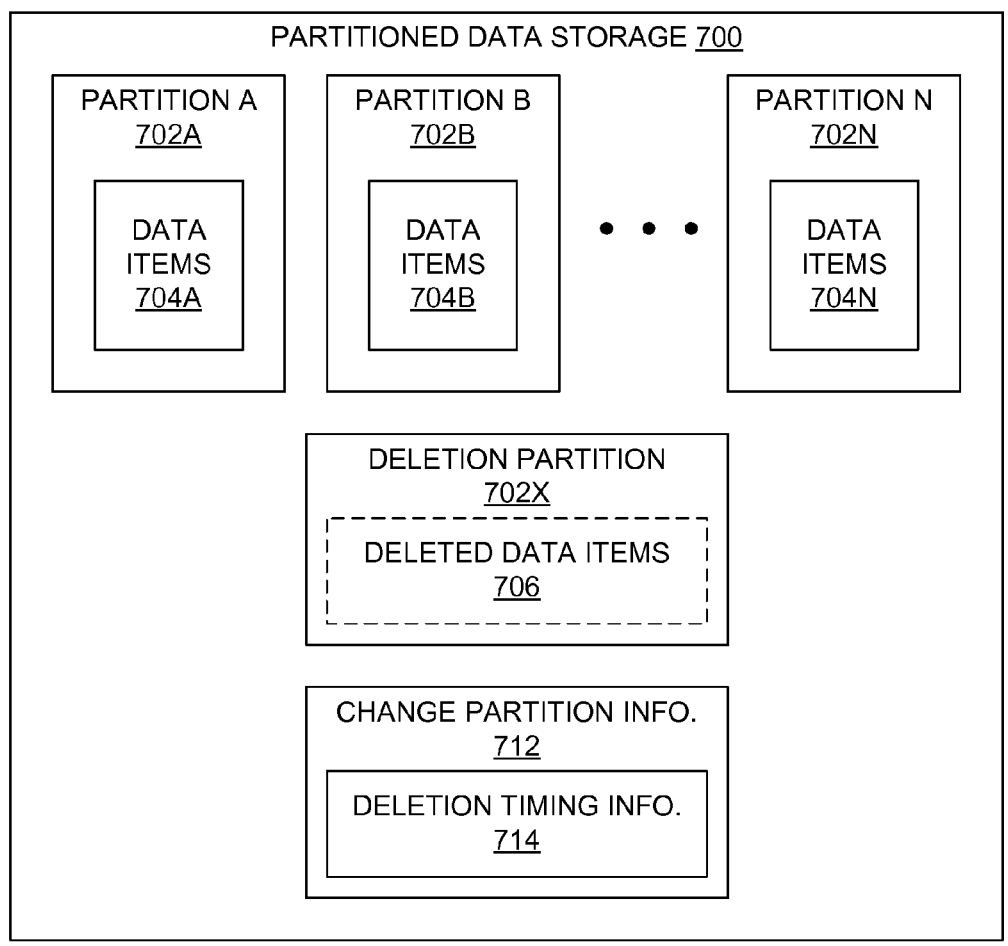
FIG. 7 is a block diagram of example data items and their associated partition change information in a partitioned database system.

In some embodiments, at least some of the embodiments described above may be implemented within a partitioned database system, in which each of the data items are stored within a particular partition for at least some period of time based on its relative level of use or activity within the system. FIG. 7 is a block diagram of a partitioned data storage 700 for such a database system 310, in which the partitioned data storage 700 includes multiple partitions 702, shown in FIG. 7 as partition A 702A, partition B 702B, and so forth through partition N 702N. Each of the partitions 702 may include data items 704, depicted as data items 704A in partition A 702A, data items 704B in partition B 702B, and the like through data items 704N in partition N 702N. Also included in the data storage 700 is change partition information 712 for the data items 704. As is described more fully below, the change partition information 712 may include deletion timing information 714 in one or more of the forms discussed earlier.

Also included in the partitioned data storage 700 is a deletion partition 702X, to which data items 704 that are to be deleted may be "stored". More accurately, when a data item 704 is stored in the deletion partition 702X, the data item 704 is actually deleted or removed from the partitioned data storage 700. In one example, the Unix® operating system provides a pseudo-device, such as "dev/null", that may serve as the deletion partition 702X.

Employing the environment of FIG. 3, the deletion monitor 316 may operate more generally as a partition monitor with respect to the partitioned data storage 700. More specifically, in response to some event occurrence or timer expiration, the deletion monitor 316 may check each of the data items 704 to determine whether that data item 704 should be relocated from its current partition 702 to another partition 702. For example, the deletion monitor 316 may check the level of access activity for the data item 704, such as via the activity condition module 318 of FIG. 3. In some arrangements, each of the partitions 702 may be associated with a particular storage capacity and/or access speed, such that data items 704 that are accessed relatively often may be stored in relatively faster partitions 702, while data items 704 that are accessed relatively infrequently may be stored in relatively slower partitions 702. In addition, data items 704 that are to be deleted according to the data deletion timing information 714 included in their corresponding change partition information 712 may be specifically moved from their current partition 702 to the deletion partition 702X. As described above, the deletion timing information 714 for the data item 704 may include one or more of a deletion flag, a deletion date and/or time, and a deletion access activity level. Further, the deletion access activity level may be incorporated with the various activity levels used to apportion the data items 704 to the remaining partitions 702A through 702N. In one example, data which is so temporary in nature that it is not to persist at all in the partitioned data storage 700 may be moved to the deletion partition 702X immediately after its use.

Figure 8:
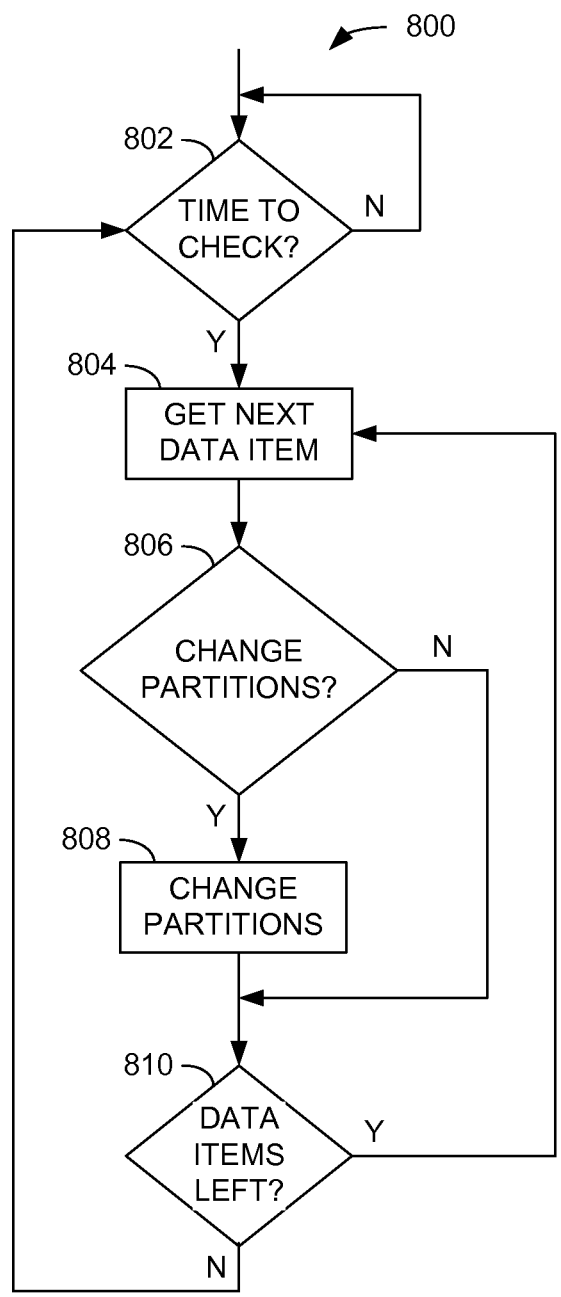
FIG. 8 is a flow diagram illustrating an example method of selecting, reapportioning, and deleting data items in a partitioned database system.

FIG. 8 is a flow diagram illustrating an example method 800 of selecting, reapportioning, and deleting data items 704 in a partitioned database system, such as a database system 310 employing the partitioned data storage 700 of FIG. 7. In the method 800, presuming the use of the database system 310 of FIG. 3, the deletion monitor 316 may determine via the event/timer handler 314 and/or the access condition module 318 whether it is time to check if one or more of the data items 704 should be moved or transitioned from one partition 702 of the data storage 700 to another partition 702 of the data storage 700 (operation 802). As before, this determination can be made, for example, in response to the occurrence of an event, such as the receipt of a signal, or in response to the expiration of a timer, via the event/timer handler 314. If the time to check has not arrived, the deletion monitor 316 may continue to wait until an event or timer condition indicates that checking for deletion of the data items 704 is to commence.

If, instead, the condition to proceed occurs, the deletion monitor 316 may then acquire a data item 704 in the data storage 700 (operation 804) and determine whether the data item 704 should be moved from one partition 702 to another (operation 806). As discussed above, the deletion monitor 316 may consult the change partition information 712 for that specific data item 704 to determine whether the data item 332 should be relocated. In one example, the change partition information 712 for the data item 704 may also incorporate or include deletion timing information 714. For example, access activity information for the data item 704 may indicate that the data item 704 is to be moved to the deletion partition 702X, which would result in the deletion of the data item 704 from the partitioned data storage 700. In some examples, the change partition information 712 for the data item 704 may be supplemented by additional deletion timing information 714 (e.g., a deletion flag or a date and/or time for deletion) that may override partition changes from one of the partitions 702A-702N to another of the partitions 702A-702N.

Presuming the data item 704 is to be moved from one partition 702 to another, the deletion monitor 316 may initiate the move via the deletion engine 320 (operation 808). In one example, a deletion that is mandated by any of the change partition information 712 or deletion timing information 714, including a deletion flag or the expiration of a timer, may be performed via a move of the data item 704 from its current partition 702 to the deletion partition 702X. After the data item 704 is checked and possibly deleted, the deletion monitor 316 may determine if there are any data items 704 left unchecked (operation 810), and, if so, may proceed to access the next data item 704 (operation 804). Otherwise, the deletion monitor 316 may wait until the next time the data items 704 of the data storage 700 are to be checked (operation 802).

As a result of at least some of the embodiments described above, the actual deletion of data items from a database system, as indicated by an application that accesses the database, is performed by the database system based on deletion timing information provided by the application and stored in the database. Presuming excess processing capacity possessed by the database system, this offloading of responsibility from the application to the database system renders deletion of unwanted data items more efficient and, hence, faster due to the resulting reduced demand on processing and communication resources on the computing system executing the application.

Figure 9:
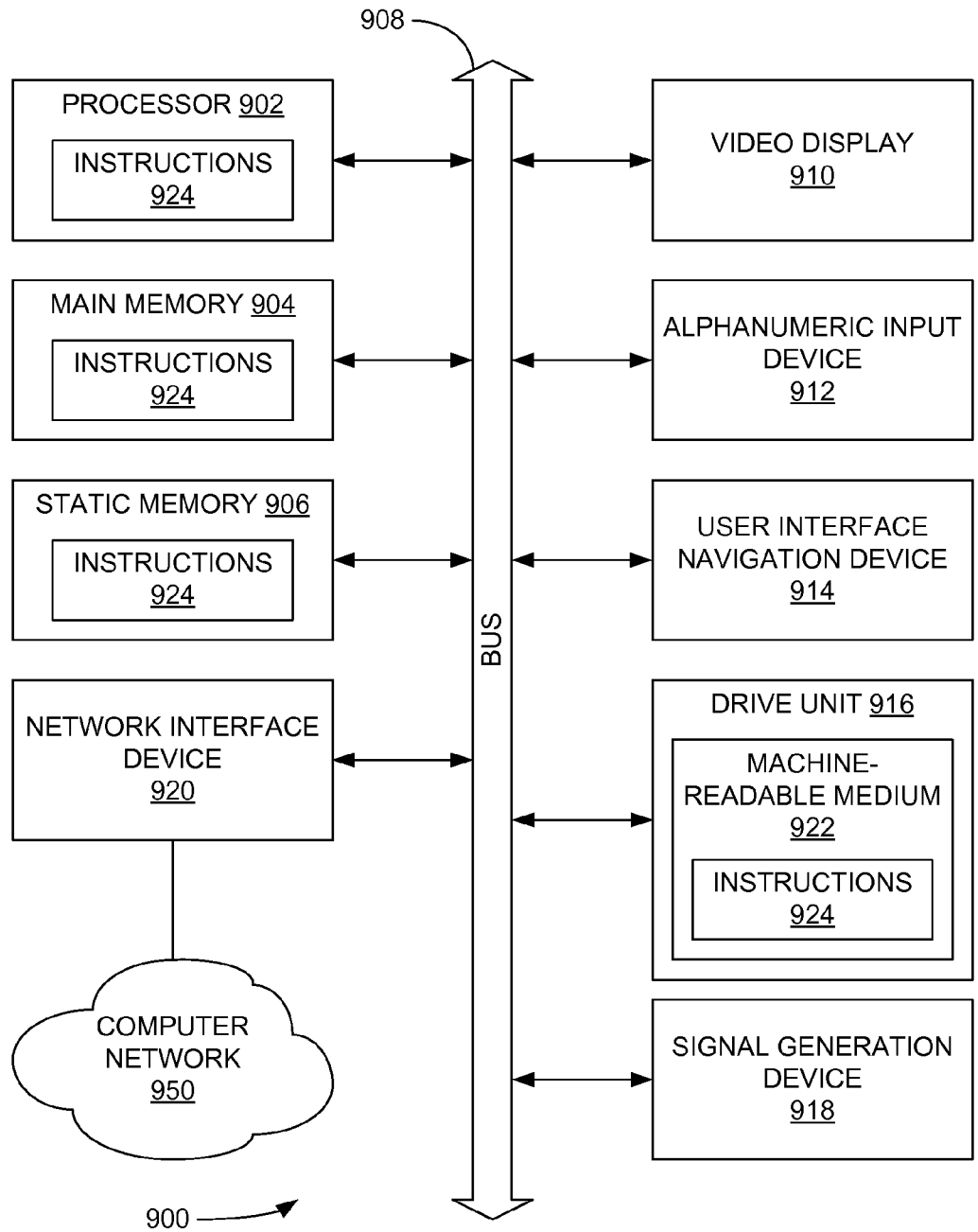
FIG. 9 is a block diagram of a machine in the example form of a processing system within which may be executed a set of instructions for causing the machine to perform any one or more of the methodologies discussed herein.

FIG. 9 depicts a block diagram of a machine in the example form of a processing system 900 within which may be executed a set of instructions 924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (e.g., a central processing unit (CPU), a graphics processing unit (GPU), or both), a main memory 904 (e.g., random access memory), and static memory 906 (e.g., static random-access memory), which communicate with each other via bus 908. The processing system 900 may further include video display unit 910 (e.g., a plasma display, a liquid crystal display (LCD), or a cathode ray tube (CRT)). The processing system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904, the static memory 906, and/or within the processor 902 during execution thereof by processing system 900, with the main memory 904, the static memory 906, and the processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 902 that is configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (e.g., within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
  receiving, from an application, a plurality of data items at a database system comprising a plurality of logical partitions, at least some of the partitions having different data access speeds;
  storing, at the database system, the plurality of data items received from the application in the plurality of logical partitions;
  receiving, at the database system from the application, deletion timing information for each of the data items, the deletion timing information for a data item indicating when the data item is to be deleted from the database system;
  storing, at the database system, the deletion timing information for each of the data items;
  deleting, using at least one processor of the database system, each of the data items at a time indicated by its corresponding deletion timing information without assistance from the application, the deleting comprising moving each of the data items to a deletion partition of the plurality of logical partitions, the deletion partition not storing the data items moved to it;
  monitoring, at the database system, an access activity level for each of the data items; and
  moving data items with a monitored access activity level that is below a predetermined access activity level to a partition, of the plurality of logical partitions, that has a lower data access speed;
  wherein a first of the data items comprises a first database record field of a database record of a business object, a second of the data items comprises a second database record field of the database record of the business object, the deletion timing information for the first database record field indicating a first time for deletion, and the deletion timing information for the second database record field indicating a second time for deletion different from the first time for deletion.

2. The method of claim 1, wherein at least one of the data items comprises a business object.

3. The method of claim 1, wherein the deletion timing information for one of the data items comprises a point in time during or after which the one of the data items is to be deleted from the database system.

4. The method of claim 1, wherein the deletion timing information for one of the data items comprises an access condition that causes the one of the data items to be deleted.

5. The method of claim 4, wherein the access condition comprises the predetermined access activity level for the one of the data items, wherein the deleting of the one of the data items is based on an access activity level for the one of the data items falling below the predetermined access activity level.

6. The method of claim 1, wherein the deletion timing information for one of the data items comprises an indication that the one of the data items is to be deleted from the database system immediately.

7. The method of claim 1, further comprising:
monitoring periodically, at the database system, the deletion timing information for each of the data items, the deleting of at least one of the data items comprising deleting a first data item based on the monitored deletion timing information of the first data item indicating the first data item is ready for deletion.

8. The method of claim 1; further comprising:
receiving, at the database system, an event;
checking, at the database system, the deletion timing information for each of the data items in response to the event, the deleting of at least one of the data items comprising deleting a first data item based on the checked deletion timing information of the first data item indicating the first data item is ready for deletion.

9. The method of claim 1, further comprising:
receiving at least one rule for generating the deletion timing information for each of the data items; and
generating the deletion timing information for each of the data items based on the at least one rule.

10. A method of deleting data stored in a database system, the method comprising:
receiving, from an application, a plurality of business data objects, at least some of the plurality of business data objects comprising multiple database record fields;
storing, in a plurality of logical partitions the database system, the plurality of business data objects received from the application, at least some of the logical partitions having different data access speeds;
receiving, at the database system from the application, deletion timing information for each of the multiple database record fields of the business data objects, the deletion timing information for a database record field indicating when the database record field is to be deleted from the database system, the deletion timing information for a first database record field of a first database record of a first business data object being different from the deletion timing information for a second database record field of the first database record of the first business data object;
storing, at the database system, the deletion timing information for each of the database record fields;
deleting, at the database system, each of the database record fields at a time indicated by its corresponding deletion timing information without assistance from the application, the deleting comprising moving each of the data items to a deletion partition of the plurality of logical partitions, the deletion partition not storing the data items moved to it;
monitoring, at the database system, an access activity level for each of the data items; and
moving data items with a monitored access activity level that is above a predetermined access activity level to a partition, of the plurality of logical partitions, that has a higher data access speed.

11. A non-transitory computer-readable storage medium comprising instructions that, when executed by at least one processor of a machine, cause the machine to perform operations comprising:
receiving, from an application, a plurality of data items at a database system comprising a plurality of logical partitions, at least some of the partitions having different data access speeds;
storing, at the database system, the plurality of data items received from the application in the plurality of logical partitions;
receiving, at the database system from the application, deletion timing information for each of the data items, the deletion timing information for a data item indicating when the data item is to be deleted from the database system;
storing, at the database system, the deletion timing information for each of the data items;
deleting, using at least one processor of the database system, each of the data items at a time indicated by its corresponding deletion timing information without assistance from the application, the deleting comprising moving each of the data items to a deletion partition of the plurality of logical partitions, the deletion partition not storing the data items moved to it;
monitoring, at the database system, an access activity level for each of the data items; and
moving data items with a monitored access activity level that is below a predetermined access activity level to a partition, of the plurality of logical partitions, that has a lower data access speed;
wherein a first of the data items comprises a first database record field of a database record of a business object, a second of the data items comprises a second database record field of the database record of the business object, the deletion timing information for the first database record field indicating a first time for deletion, and the deletion timing information for the second database record field indicating a second time for deletion different from the first time for deletion.

12. The computer-readable storage medium of claim 11, wherein the deletion timing information for one of the data items comprises a point in time during or after which the one of the data items is to be deleted from the database system.

13. The computer-readable storage medium of claim 11, wherein the deletion timing information for one of the data items comprises an access condition that causes the one of the data items to be deleted.

14. The computer-readable storage medium of claim 11, wherein the deletion timing information for one of the data items comprises an indication that the one of the data items is to be deleted from the database system immediately.

15. A database system comprising:
data storage for storing data items;
at least one processor; and
memory comprising instructions that, when executed by the at least one processor, cause the at least one processor to perform operations comprising:

receiving, from an application, a plurality of data items at a database system comprising a plurality of logical partitions, at least some of the partitions having different data access speeds;

storing, at the database system, the plurality of data items received from the application in the plurality of logical partitions;

receiving, at the database system from the application, deletion timing information for each of the data items, the deletion timing information for a data item indicating when the data item is to be deleted from the database system;

storing, at the database system, the deletion timing information for each of the data items;

deleting, using at least one processor of the database system, each of the data items at a time indicated by its corresponding deletion timing information without assistance from the application, the deleting comprising moving each of the data items to a deletion partition of the plurality of logical partitions, the deletion partition not storing the data items moved to it;

monitoring, at the database system, an access activity level for each of the data items; and moving data items with a monitored access activity level that is below a predetermined access activity level to a partition, of the plurality of logical partitions, that has a lower data access speed;

wherein a first of the data items comprises a first database record field of a database record of a business object, a second of the data items comprises a second database record field of the database record of the business object, the deletion timing information for the first database record field indicating a first time for deletion, and the deletion timing information for the second database record field indicating a second time for deletion different from the first time for deletion.

* * * * *